Nov. 9, 1948.  J. W. TILEY ET AL  2,453,283
MICROWAVE POWER MEASURING APPARATUS
Filed Aug. 30, 1944
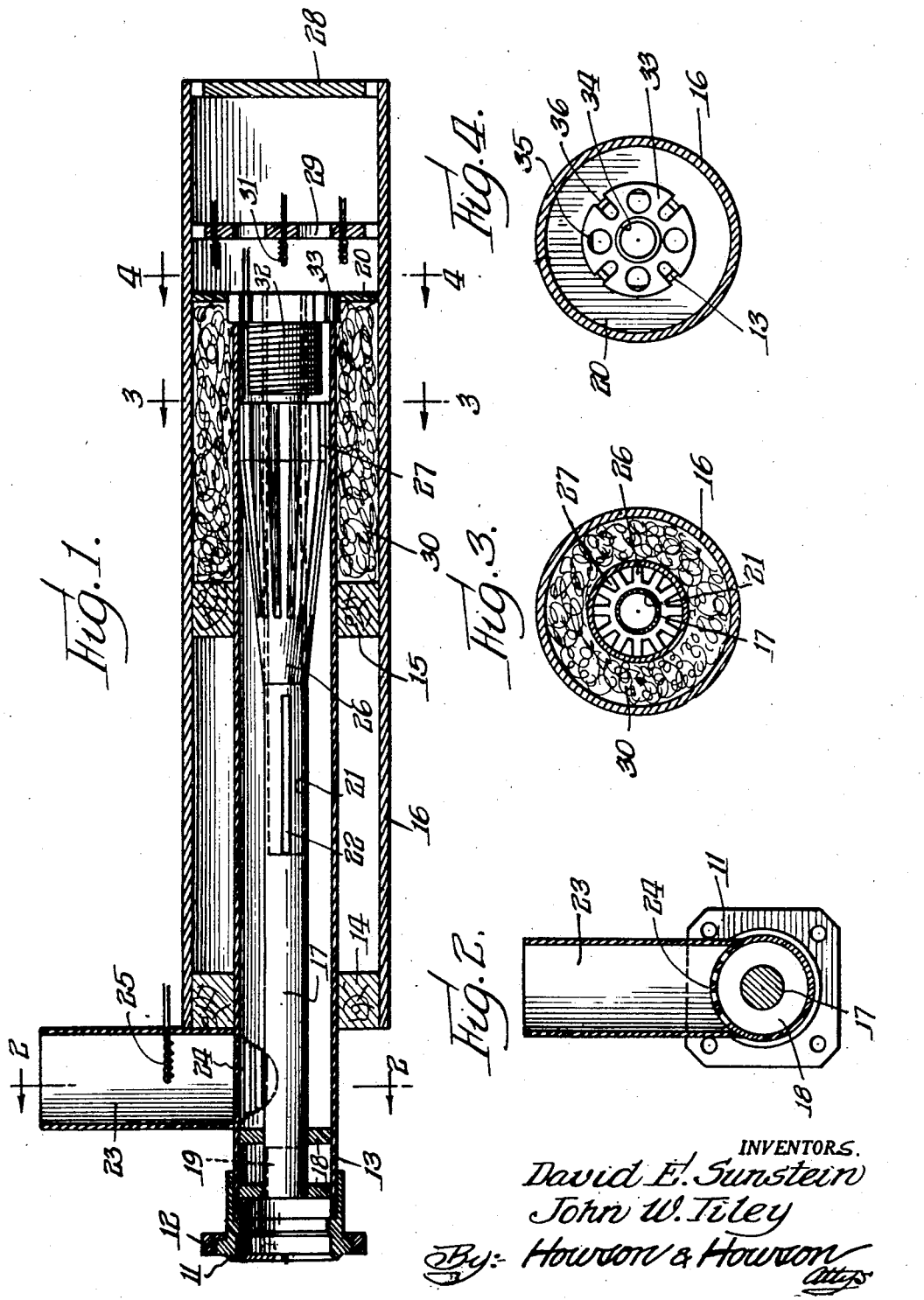
INVENTORS.
David E. Sunstein
John W. Tiley
By: Howson & Howson
Attys Patented Nov. 9, 1948

2,453,283

UNITED STATES PATENT OFFICE 2,453,283

MICROWAVE POWER MEASURING APPARATUS

John W. Tiley, Philadelphia, and David E. Sunstein, Elkins Park, Pa., assignors to Philco Corporation, Philadelphia, Pa., a corporation of Pennsylvania Application August 30, 1944, Serial No. 551,947

3 Claims. (Cl. 171—95)

The present invention relates to terminations for transmission lines, and more particularly to such terminations which may be used for the measurement of the power of ultra high frequency radio energy.

In the operation of ultra high frequency equipment it frequently is desired to test coaxial lines or conductors in the equipment connected thereto. In the manufacture and in the operation of ultra high frequency apparatus, it is desired to make adjustments or calibrations with some indication of the change in power obtained under various operating conditions. Where for example the adjustment and calibration of an ultra high frequency transmitter is to occur, the ultra high frequency energy may be fed into a transmission line which is provided with means for dissipating the ultra high frequency energy without substantial effect upon the transmitter. Measurement of power thus dissipated is accomplished by use of the substitution method since generally it is not possible to obtain instruments for accurately directly measuring the ultra high frequency energy. Thus the ultra high frequency energy is converted into heat and the change in temperature will give a relative indication of the power converted when compared to the similar change brought about by other energy changes readily capable of measurement. Heretofore it has been proposed to dissipate the ultra high frequency energy in the form of heat and to absorb the heat in a liquid medium such as water. Such an arrangement requires a supply of water of a given purity and apparatus which accurately indicates the temperature change in the water. The water is circulated through the apparatus in which the energy dissipation occurs and in spite of precautions it frequently is noted that air bubbles gather at certain points thereby giving inaccurate readings and results. Such liquid utilizing apparatus is relatively complicated and requires considerable care in the operation, and hence it will be highly desirable to provide some other form of apparatus which will be simpler and which would obviate certain disadvantages.

In accordance with the present invention a coaxial line termination is provided which utilizes a dielectric impedance device so constructed and arranged as to produce no substantial reflection of incident energy and which has a high loss characteristic so that the incident energy is substantially entirely converted into heat. Air of constant velocity is directed over the termination and measurements are made of the incoming and outgoing air temperatures. Subsequently the ultra high frequency energy is shut off and heat is generated in the apparatus housing the termination to give comparable readings as to temperature differences in the incoming and outgoing air. The amount of power used to bring about the same temperture readings or differences may be observed by means of a watt meter to give a direct reading of the average power dissipated by the termination device.

It, therefore, is an object of the present invention to provide an improved apparatus for terminating a transmission line with means for measuring temperature change in a dissipating medium.

It is another object of the present invention to provide an improved termination device for a transmission line utilizing gas such as air as a dissipating medium.

Other and further objects of the present invention subsequently will become apparent by reference to the following description taken in connection with the accompanying drawing wherein Figure 1 illustrates, primarily in longitudinal cross section, the structure of a device incorporating the present invention;

Figure 2 is a view as seen in the direction of the arrows along the line 2—2 of Figure 1;

Figure 3 is a view in the direction of the arrows along the line 3—3 of Figure 1 illustrating the structure of the member which converts incident ultra high frequency energy into heat; and Figure 4 is a view along the line 4—4 in the direction of the arrows in Figure 1 showing certain features of the substitution heater of the apparatus.

Figure 1 shows a line termination apparatus provided with a coupling ring 11 having a fastening flange 12 for cooperation with a complementary member mounted on the outer conductor of a coaxial line which is to supply ultra high frequency energy to be measured. The member 11 is suitably secured to the outer conductor 13 of a portion of a coaxial conductor which is supported by a plurality of suitable support members 14 and 15 within an enclosure 16 which has been shown as being cylindrical in form. The coaxial line includes a central conductor 17 supported at one end by a plurality of insulating members or beads 18 and supported at the other end by a structure subsequently to be described. The forward end of the central conductor 17 is provided with a coaxial recess 19 for engagement with the coaxial conductor of a coaxial line to which the apparatus shown in Figure 1 is to be connected. The coaxial conductor for a certain distance from the recess 19 is of solid material and subsequently the conductor is provided with a longitudinal bore 21 having a plurality of elongated slits 22 communicating between the outer surface of the conductor 17 and the inner bore 21. The inner bore 21 extends to the farthermost end of the conductor 17. Adjacent the forward portion of the coaxial line section 13 there is mounted a pipe-like member 23 arranged to be in restricted communication with the interior of the outer coaxial conductor 13 by the provision of a plurality of baffle slot members 24 of a suitable arrangement such as is apparent from Figures 1 and 2. The pipe 23 is connected to a suitable source of constant velocity air which passes from the pipe 23 into the space between the outer conductor 13 and the inner conductor 17 of the apparatus. One or more thermocouples 25 may be mounted within the pipe 23 in order to obtain an indication of the temperature of the incoming air.

Mounted adjacent the rear extremity of the inner conductor 17 is a termination device 26 having a frusto-conical configuration which is provided with a plurality of longitudinal extending slots 27 to permit the passage of air past the termination device. The outer frusto-conical configuration of the device 24 is preferably such as to prevent substantially any reflection of incident ultra high frequency energy back along the coaxial line. The member 26 is formed of a suitable material so as to have a relatively high loss characteristic so that the incident ultra high frequency energy may be converted into heat. Preferably the member 26 is formed of a suitable ceramic such as steatite or other suitable clay mixed with a resistive material in finely divided form such as silicon carbide, lamp black or colloidally suspended deflocculated graphite. Ceramic mixes of this type have been found to be relatively stable and to exhibit small variations with changes in temperature and humidity. Preferably the ceramic member 26 is secured to the inner coaxial conductor 17 by a suitable ceramic cement, and the maximum diameter of the ceramic member 26 is such as to be in close contact with the inner wall of the outer conductor 13 so as to increase to the maximum its heat dissipating possibilities. Air entering the pipe 23 and passing through the baffles or louvers 24 will pass between the inner and outer coaxial conductors over the termination device 26 through the grooves 27 therein, and also pass through the slots 22 communicating with the inner bore 21 of the coaxial conductor 27 so as to cool the interior of the coaxial conductor. The air thereupon leaves the end of the outer conductor 13 and passes on to a baffle member 28 mounted at the end of the cylindrical member 16. Interposed between the baffle member 28 and the end of the coaxial line is a suitable mounting plate 29 serving to support a plurality of thermocouples 31 so that an indication may be had of the temperature rise occurring in the air due to the passage of the air past the line termination device 26.

In order to provide for an indication of the power dissipated by the high loss resistive ceramic member 26 there is provided an electric heater 32 supported upon a suitable insulating or ceramic member 33 mounted at the end of the outer conductor 13. The supporting member 33 has a central aperture 34 to permit the escape of air from the bore 21 of the central conductor 17. Other apertures 35 and recesses 36 of suitable configuration are provided for the escape of the air which has passed through the grooves 27 of the high loss device 26.

The ceramic member 33 which is mounted at the end of the conductor 13 of the coaxial line may also be supported by a plate 20 extending to the inner surfaces of the outer housing 16. The space between the supporting member 20, the supporting member 15, the inside of the housing 16, and the outer conductor 13 preferably is filled with a heat insulation material 30 such as rock wool. The heat insulation material prevents dissipation of heat outwardly through the outer casing 16 in the proximity of the impedance device 27 and the electrical heater 32. Thus air which passes past the impedance device 27 and the electrical heater 32 must absorb substantially all of the heat generated, and no appreciable heat is conducted away by the other parts of the apparatus. Thus the thermopiles 31 will respond to substantially all of the heat generated by the apparatus either at the time that the ultra high frequency energy is being converted into heat by the impedance device 26 or at the time when heat is being generated by the electrical heater 32. This increases the accuracy of the results obtained from the indications produced by the thermopiles 25 and 31. The baffle 28 at the end of the outer housing 16 prevents the air currents from the room from affecting the temperature to be indicated by the thermopiles 31. Thus it will be appreciated that the entire assembly has been arranged so as to minimize the effect of ambient temperature and external air circulation and thereby to increase the accuracy of the results.

By suitable apparatus, of conventional structure not illustrated in the drawing but well known to those skilled in the art, a constant flow of air at a constant pressure is supplied to the pipe 23 while ultra high frequency energy is being supplied to the coaxial line comprising the outer conductor 13 and the inner conductor 17. The ultra high frequency energy reaches the ceramic member 26 which because of its high loss characteristic dissipates the energy without substantial reflection in the form of heat. The heat in turn is absorbed by the air flowing around the member 26 and through the inner bore 21 of the coaxial conductor 17. The air then passes past the heater 32 and support 33 therefor toward the rear baffle member 28 of the outer enclosure 16. The thermocouples 25 and 31 are connected to give an indication of the temperature difference between the incoming and outgoing air. The ultra high frequency energy is then cut off and alternating current sixty cycle power is supplied to the electrical heater 32 and adjusted by suitable control means to give the same temperature readings or temperature difference obtained under the same air conditions as with the ultra high frequency power. If the alternating current power thus supplied is read directly from a watt meter this power corresponds to the average ultra high frequency power dissipated. If a reading other than the average ultra high frequency power is desired the watt meter may be calibrated to read peak radio frequency power on pulse modulation (for a given radio frequency duty cycle), or average radio frequency voltage (for a given characteristic impedance transmission line), or peak radio frequency voltage (for a given radio frequency duty cycle and characteristic impedance transmission line). It thus will be appreciated that the apparatus thus provided greatly simplifies the substitution method for measuring power and that for certain operating conditions after calibration the temperature readings may be interpreted or calibrated so as to indicate the power dissipated.

While the impedance device 26 has been described as having a surface such that the incident ultra high frequency energy is not reflected back along the line and in assembly it is preferable to construct the impedance device 26 so as to provide the proper impedance for the coaxial line to which the apparatus is to be connected, it will be understood that by suitable calculations results may be obtained giving a correct indication of the ultra high frequency power even when the impedance match is not perfect. Where the impedance match is imperfect this is taken into account in the calculations made, based upon the readings obtained from the thermopiles 25 and 31.

While the arrangement shown is particularly adapted for use in conjunction with coaxial transmission lines, it of course will be appreciated that with appropriate changes in mechanical dimensions and arrangements, a corresponding structure may be provided for wave guides. It further will be appreciated that while a particular embodiment has been shown for purposes of illustrating and describing the invention, that such variations and modifications are intended as may be commensurate with the spirit and scope of the invention as defined in the appended claims.

This invention is hereby claimed as follows:

1. A device for measuring ultra high frequency energy by the substitution method comprising a coaxial line provided with a ceramic body having a generally cylindrical portion and a frusto-conical portion, said cylindrical portion having an outer diameter substantially equal to the inner diameter of the outer line conductor and an axial aperture equal to the diameter of the inner line conductor, a substantial portion of said body being provided with longitudinal recesses to permit the passage of fluid medium past said body, means for admitting a fluid medium to the interior of said outer conductor, means for permitting the passage of said fluid medium through the inside of said inner conductor, means for measuring the temperature of said fluid medium before and after passage past said body, and an electrical heating means positioned adjacent said body for producing a temperature change comparable to the temperature produced by ultra high frequency energy dissipated by said body.

2. A device for the measurement of ultra high frequency power comprising a coaxial line section adapted to be connected to a coaxial line arranged to supply ultra high frequency power, means for admitting air under constant conditions to said coaxial line section, a dielectric body mounted on said inner conductor and extending to the inner surface of said outer conductor, said dielectric body being composed of a material exhibiting small change due to temperature variation and having an incident energy surface which will produce substantially no reflection back along the transmission line, said dielectric body having a high loss characteristic for converting incident ultra high frequency energy into heat, a housing for said outer conductor arranged to surround at least that portion of the conductor adjacent said dielectric body, thermopile means mounted so as to be responsive to the temperature of the air entering said coaxial line section and the air leaving said coaxial line section, and an electric heating means mounted adjacent said dielectric body for producing similar temperature variations in the air when no ultra high frequency energy is being received by said dielectric body.

3. A device for the measurement of ultra high frequency power comprising a coaxial line section adapted to be connected to a coaxial line arranged to supply ultra high frequency power, means for admitting air under constant conditions to said coaxial line section, a dielectric impedance body mounted on said inner conductor, said body being composed of a material exhibiting small change due to temperature variation and having a high loss characteristic for converting into heat ultra high frequency energy entering said body, a housing for said outer conductor arranged to surround at least that portion of the conductor adjacent said dielectric body, heat insulation means interposed between said coaxial line section and said housing in the proximity of the location of said impedance body, thermopile means mounted so as to be responsive to the air entering said coaxial line section, thermopile means mounted so as to be responsive to the temperature of the air leaving said coaxial line section, baffle means mounted within said housing for preventing air currents from entering said housing to vary the temperature of said latter thermopile means, and an electric heating element mounted adjacent said dielectric body for producing similar temperature variations in the air passing through said coaxial line section when no ultra high frequency energy is being received by said dielectric body.

JOHN W. TILEY.
DAVID E. SUNSTEIN.

REFERENCES CITED

The following references are of record in the file of this patent:

UNITED STATES PATENTS

| Number | Name | Date |
| --- | --- | --- |
| 1,088,280 | Hottinger | Feb. 24, 1914 |
| 1,866,611 | Affel | July 12, 1932 |
| 1,957,454 | Gebhard | May 8, 1934 |
| 2,153,001 | Rabe | Apr. 4, 1939 |
| 2,262,134 | Brown | Nov. 11, 1941 |
| 2,273,547 | Radinger | Feb. 17, 1942 |
| 2,294,881 | Alford | Sept. 8, 1942 |
| 2,387,158 | Kozanowski | Oct. 16, 1945 |
| 2,398,606 | Wang | Apr. 16, 1946 |